United States Patent
Pratt et al.

(10) Patent No.: US 8,595,804 B2
(45) Date of Patent: Nov. 26, 2013

(54) SYSTEM AND METHOD FOR DEVICE SECURITY WITH A PLURALITY OF AUTHENTICATION MODES

(75) Inventors: James Pratt, Round Rock, TX (US); Larry Pearson, San Antonio, TX (US); Marc Sullivan, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 444 days.

(21) Appl. No.: 12/265,900

(22) Filed: Nov. 6, 2008

(65) Prior Publication Data

US 2010/0115607 A1    May 6, 2010

(51) Int. Cl.
G06F 7/04        (2006.01)
G06F 21/00       (2006.01)

(52) U.S. Cl.
USPC .................. 726/5; 726/18; 713/182; 713/186

(58) Field of Classification Search
USPC ........ 726/2–10, 16–21, 26–30; 713/182–186; 340/5.8–5.85
See application file for complete search history.

(56) References Cited

U.S. PATENT DOCUMENTS

| | | | | |
|---|---|---|---|---|
| 5,548,647 A * | 8/1996 | Naik et al. | | 704/200 |
| 5,774,525 A * | 6/1998 | Kanevsky et al. | | 379/88.02 |
| 6,076,167 A * | 6/2000 | Borza | | 726/5 |
| 6,256,737 B1 * | 7/2001 | Bianco et al. | | 713/186 |
| 7,110,987 B2 | 9/2006 | Engelhart | | |
| 7,263,347 B2 | 8/2007 | Engelhart | | |
| 2001/0049785 A1 * | 12/2001 | Kawan et al. | | 713/156 |
| 2002/0091937 A1 * | 7/2002 | Ortiz | | 713/200 |
| 2002/0147914 A1 * | 10/2002 | Arnold | | 713/186 |
| 2003/0084289 A1 * | 5/2003 | Watanabe | | 713/168 |
| 2003/0149882 A1 | 8/2003 | Hamid | | |
| 2003/0210127 A1 * | 11/2003 | Anderson | | 340/5.27 |
| 2004/0030934 A1 * | 2/2004 | Mizoguchi et al. | | 713/202 |
| 2004/0093527 A1 * | 5/2004 | Pering et al. | | 713/202 |
| 2004/0230843 A1 * | 11/2004 | Jansen | | 713/202 |
| 2006/0053285 A1 * | 3/2006 | Kimmel et al. | | 713/166 |
| 2006/0239514 A1 * | 10/2006 | Watanabe et al. | | 382/115 |
| 2007/0136604 A1 * | 6/2007 | Kuhlman et al. | | 713/186 |
| 2007/0241861 A1 * | 10/2007 | Venkatanna et al. | | 340/5.52 |
| 2007/0277224 A1 * | 11/2007 | Osborn et al. | | 726/2 |
| 2008/0098464 A1 * | 4/2008 | Mizrah | | 726/5 |
| 2008/0229397 A1 * | 9/2008 | Basner et al. | | 726/5 |
| 2009/0153292 A1 * | 6/2009 | Farb | | 340/5.52 |
| 2009/0320124 A1 * | 12/2009 | Taxier et al. | | 726/17 |

OTHER PUBLICATIONS

Lawrence O'Gorman, Amit Bagga, Jon Bentley, "Call Center Customer Verification by Query-Directed Passwords," Avaya Labs, Basking Ridge, NJ, USA. Retrieved from http://pubs.research.avayalabs.com/pdfs/ALR-2003-045-paper.pdf on Jul. 10, 2013.

* cited by examiner

*Primary Examiner* — Darren B Schwartz
(74) *Attorney, Agent, or Firm* — Hartman & Citrin LLC (57) ABSTRACT

A security processing element stores authentication data corresponding to a plurality of possible authentication modes. At a time of activation, the security processing element randomly selects one of the authentication modes for presentation to the user. The user must successfully enter data corresponding to the randomly selected authentication mode. In an alternative embodiment, the security processing element can randomly select a plurality of authentication modes that are sequentially presented to the user. The user must successfully respond to each of the plurality of requested authentication modes. In another embodiment, for high security communications, the security processing element may select from a subset of authentication modes that are considered to be more robust. Conversely, the security processing element may select from a subset of randomly presented authentication modes that are considered less robust when used in a low security setting.

24 Claims, 5 Drawing Sheets

SYSTEM AND METHOD FOR DEVICE SECURITY WITH A PLURALITY OF AUTHENTICATION MODES

BACKGROUND OF THE INVENTION

1. Field of the Invention

The present invention is directed generally to device security, and, more particularly, to a system and method for device security using a plurality of authentication modes.

2. Description of the Related Art

Electronic devices are pervasive in modern society. Electronic devices are used for everything from entertainment to communications. Personal communications and high security communications, such as financial transactions, are also widely conducted using modern electronic devices.

Authentication processes, such as passwords, are often used to provide security with electronic devices. Passwords may be used with a typical consumer device, such as a television, to permit parents to restrict access to selected television programming. In communication devices, it is desirable to prevent others from accessing personal information on a wireless communication device. Other communication devices, such as computers or web-enabled cell phones, can be used to conduct financial transactions. In addition to encryption of data, it is desirable to provide password security as a barrier to unauthorized access of the electronic devices.

Those skilled in the art will recognize that simple forms of password protection, such as a three or four digit Personal Identification Number (PIN) are easy to use, but provide a relatively low degree of security. It is known that unscrupulous individuals may view an individual's PIN entry by looking over the user's shoulder. Thus, easy to use forms of security often provide a lower degree of protection than is desired. Therefore, it can be appreciated that there is a significant need for a system and method for security in electronic devices. The present invention provides this, and other advantages, as will be apparent from the following detailed description and accompanying figures.

DETAILED DESCRIPTION OF THE INVENTION

Electronic devices constructed in accordance with the present teachings have a variety of authentication modes. As will be described in greater detail, the electronic device randomly presents a plurality of different authentication modes that the user must successfully enter. Even if some of the authentication modes are relatively simple, such as a Personal Identification Number (PIN), the random selection of authentication modes makes it more difficult for an unscrupulous individual to successfully access the electronic device.

Figure 1:
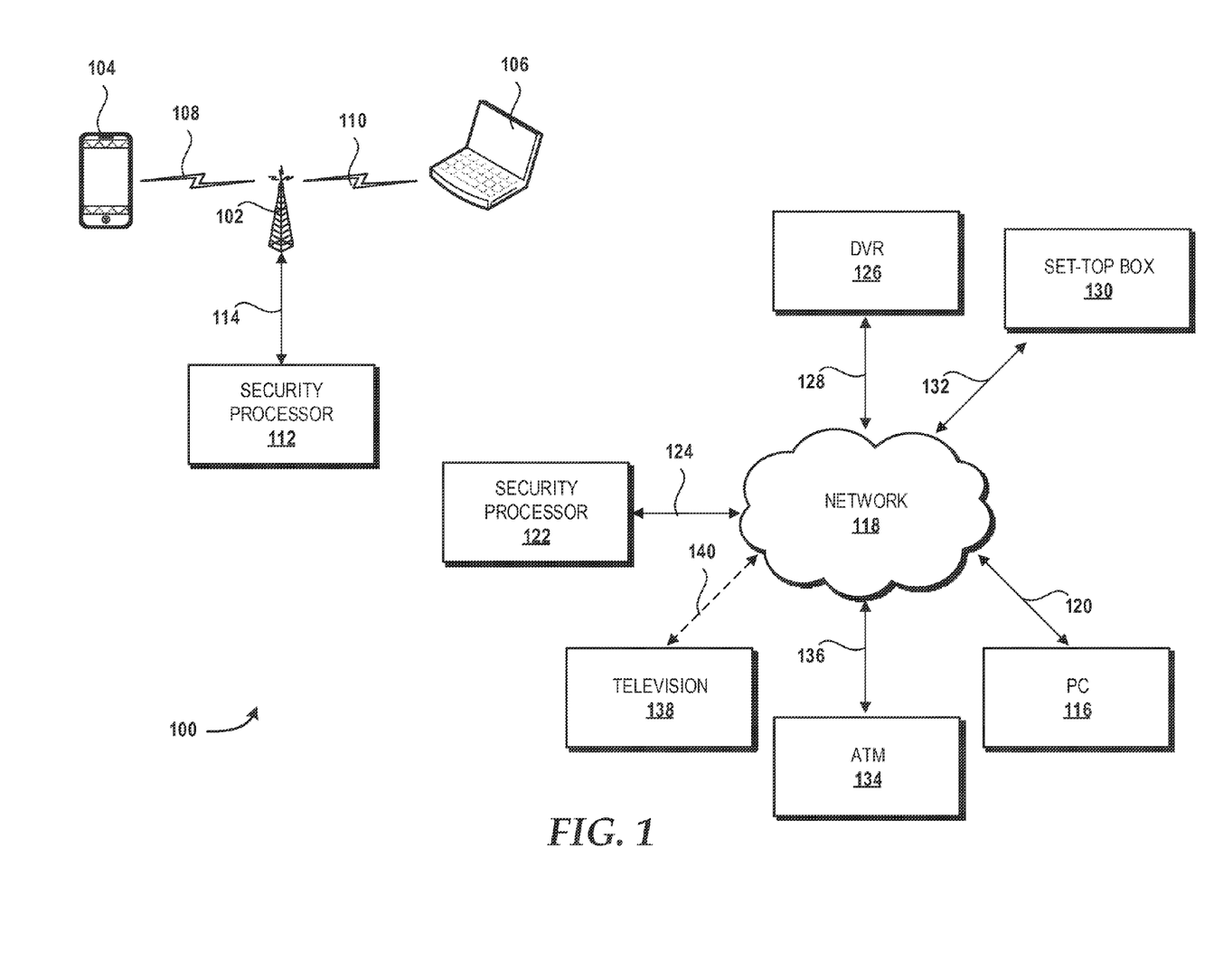
FIG. 1 is a diagram illustrating sample system architectures constructed in accordance with the present teachings.

The multi-modal authentication system may be contained within an individual device or be network-based. FIG. 1 illustrates sample systems 100 used to implement the multi-modal authentication system. In one embodiment, a base station 102 communicates with a wireless communication device 104 and a wireless computer 106. Those skilled in the art will recognize that a typical base station 102 communicates with a large number of wireless communication devices 104 and/or wireless computers 106. For simplicity, FIG. 1 only shows the wireless communication device 104 and the wireless computer 106 coupled to the base station 102. In addition, FIG. 1 does not illustrate the other infrastructure associated with a wireless system, such as a mobile switching center, system control node, and the like. Those elements are known in the art and need not be described herein.

The wireless communication device 104 may be a cell phone, personal communications system, personal digital assistant (PDA), or the like. Those skilled in the art will appreciate that many wireless communication devices 104 are web-enabled, which allows the user access to many functions ranging from simple communication, e-mail, and the like, to secure communications, such as financial transactions. The wireless communication device 104 communicates with the base station 102 via a communication link 108.

The wireless computer 106 is representative of a family of wireless devices, such as a laptop computer, that communicates with the base station 102 via a communication link 110. It is well known that the wireless computer 106 may communicate with a wide-area network, such as the Internet, from a variety of locations. For example, the user may be in an "Internet café" on the Internet via a network access point within the retail establishment. In this embodiment, the network access point provides the functionality of the base station 102.

The base station 102 communicates with a security processor 112 via a communication link 114. As will be described in greater detail below, the security processor 112 may present multiple authentication modes to the user of the wireless communication device 104 and/or wireless computer 106.

The multi-modal authentication system is not limited to wireless communications. As illustrated as the sample systems 100, a personal computer (PC) 116 may be coupled to a network 118 via a communication link 120. The network 118 may be a wide-area network, such as the Internet, or may be a local area network (LAN), such as a cable television distribution system. The PC 116 communicates with the network 118 in a conventional manner. Even if the network 118 is a LAN, it is possible for the PC 116 to access the Internet via the LAN 118 by appropriate connection to a service provider. For example, a cable modem allows the user to have cable television as well as Internet access through the cable service provider. The actual communication protocol and data exchanges between the PC 116 and the network 118 are well known in the art and need not be described herein.

A security processor 122 is coupled to the network 118 via a communication link 124. FIG. 1 illustrates the security processor 112 and the security processor 122 as separate devices. However, the security processor 112 is functionally equivalent to the security processor 122. Indeed, in an alternative embodiment, the base station 102 may communicate directly with the network 118 via the communication link 114. In this embodiment, the base station 102 may communicate with the security processor 122 via the communication link 114, network 118, and communication link 124. FIG. 1 illustrates the distributed nature of the security processors and also demonstrates that different communication service providers may each provide its own security processor, such as the security processor 112 in a wireless communications network and the security processor 122 for other network communications.

As illustrated in FIG. 1, other electronic devices, such as a digital video recorder (DVR) 126 and a set-top box 130 may also have the multi-modal authentication system. The DVR 126 is coupled to the network 118 via a communication link 128, while the set-top box 130 is coupled to the network 118 via a communication link 132. As described above, the network 118 may be a wide-area network, such as the Internet, or a LAN. In the present example, the network 118 may be, by way of example, a cable service provider and the DVR 126 and set-top box 130 are coupled to the cable company via conventional means, such as a wired connection, fiber-optic, wireless connection, a combination of one or more of the above, or the like.

In another embodiment, the electronic device is an automated teller machine (ATM) 134, which is coupled to the network 118 via a communication link 136. In this example, the network 118 may typically be a LAN that is exclusively used by the banking institution that owns the ATM 134. Alternatively, the ATM 134 may be coupled to the Internet and communicate with one or more financial institutions via the Internet. Those skilled in the art will appreciate that the actual data transmitted between the ATM 134 and the financial institution may be encrypted. The present invention is not related to encryption itself, but to authentication utilization that denies access to unauthorized individuals.

In yet another example, a television 138 may be coupled to the network 118 via a communication link 140. As described above with respect to the DVR 126 and set-top box 130, the television 138 may be coupled to, by way of example, a cable service provider. The communication link 140 is illustrated by a dashed line to illustrate that the connection to the network 118 is optional for authentication security protection. For example, the television 138 may be coupled to a cable service provider via the communication link 140 to permit communication between the television 138 and the security processor 122. Alternatively, the authentication system described herein may be self-contained within the television 138. In this alternative embodiment, the required elements of the security processor 122 are integrated into the television 138 itself, thus there is no need for the communication link 140 between the television 138 and the network 118 for purposes of accessing the security processor 122. There may still be a communication link between the television 138 and the network 118 for purposes of providing the multi-media signals from the cable service provider. Similarly, other devices, such as the DVR 126 and set-top box 130 may also include self-contained authentication systems constructed in accordance with the present teachings. Thus, some embodiments of the authentication system can be self-contained and need not require access to the security processor 122 via a network connection.

Figure 2:
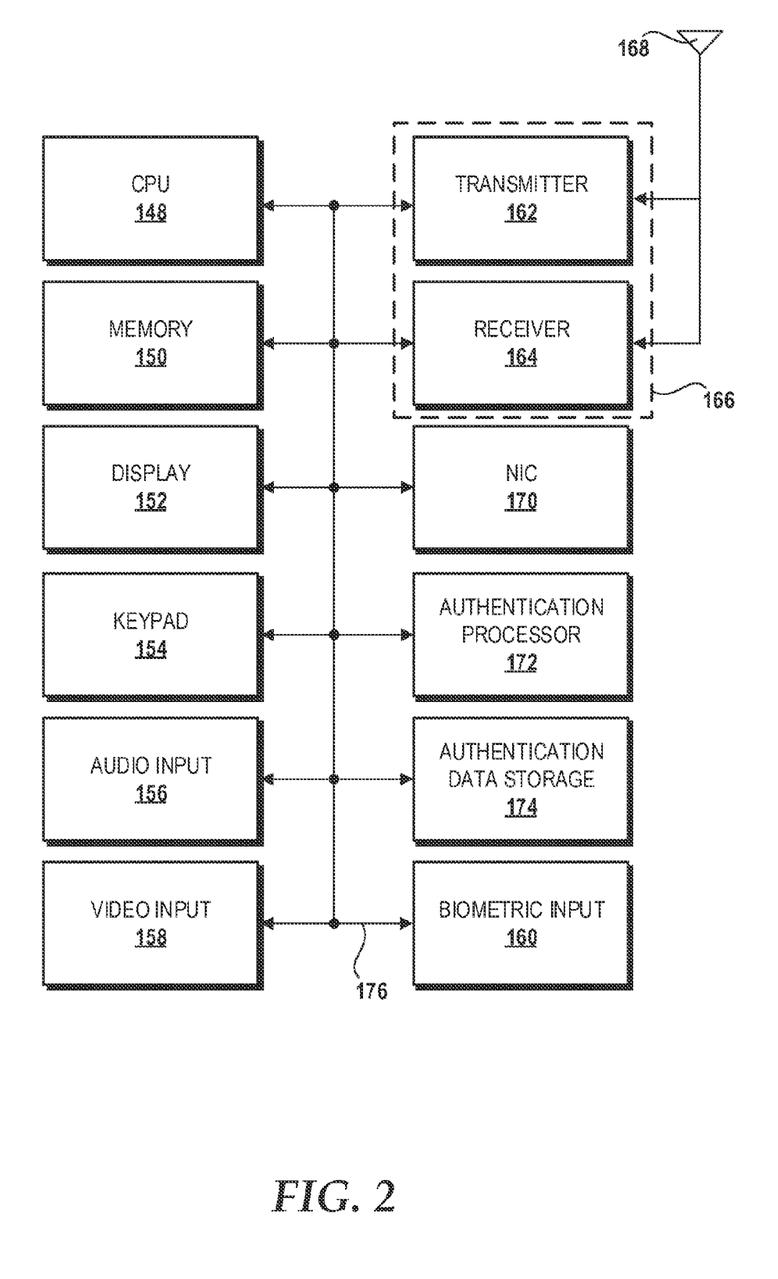
FIG. 2 is a functional block diagram of an electronic device having multi-modal authentication processes.

FIG. 2 is a functional block diagram of an electronic device, such as the wireless communication device 104 in FIG. 1. The functional block diagram of FIG. 2 is equally applicable to the wireless computer 106 or, with slight modification, to the other devices illustrated in FIG. 1 (e.g., the PC 116, DVR 126, set-top box 130, ATM 134, and television 138). The device includes a central processing unit (CPU) 148. Those skilled in the art will appreciate that the CPU 148 may be implemented as a conventional microprocessor, application specific integrated circuit (ASIC), digital signal processor (DSP), programmable gate array (PGA), or the like. The wireless communication device 104 is not limited by the specific form of the CPU 148.

The electronic device in FIG. 2 also contains a memory 150. The memory 150 may store instructions and data to control operation of the CPU 148. The memory 150 may include random access memory, ready-only memory, programmable memory, flash memory, and the like. The electronic device is not limited by any specific form of hardware used to implement the memory 150. The memory 150 may also be integrally formed in whole or in part with the CPU 148.

The electronic device of FIG. 2 also includes conventional components, such as a display 152, keypad or keyboard 154 and audio input device 156. The electronic device may also include a video input 158 and a biometric input device 160. The video input 158 may be a conventional built-in camera that is common in many electronic devices. The biometric input device 160 may be a fingerprint scanning device, which is also a known device. These are conventional components that operate in a known manner and need not be described in greater detail.

The electronic device of FIG. 2 also includes a transmitter 162 such as may be used by the wireless communication device 104 and wireless computer 106 for normal wireless communication with the base station 102 (see FIG. 1). FIG. 2 also illustrates a receiver 164 that operates in conjunction with the transmitter 162 to communicate with the base station 102. In a typical embodiment, the transmitter 162 and receiver 164 are implemented as a transceiver 166. The transceiver 166 is connected to an antenna 168. Operation of the transceiver 166 and the antenna 168 is well-known in the art and need not be described in greater detail herein. Those skilled in the art will recognize that electronic devices such as the DVR 126, set-top box 130, and television 138 may not include the transceiver 166 since wireless communication is not a typical form of communication for such devices.

The electronic device of FIG. 2 also includes a network interface controller (NIC) 170. The NIC 170, such as an Ethernet controller, operates in a conventional manner to permit communication with the network 18. It should be noted that the wireless communication device 104 may or may not include the NIC 170. However, the wireless computer 106 typically includes the NIC 170 in addition to the transceiver 166. The operation of the NIC 170 is well known in the art and need not be described in greater detail herein.

In a stand alone embodiment, the electronic device of FIG. 2 includes an authentication password processor 172 and an authentication data storage 174. As will be described in greater detail below, the authentication processor 172 presents a plurality of authentication modes to the user prior to permitting user access to the device. Alternatively, the authentication processor 172 may present multiple authentication modes to the user prior to permitting user access to certain services available through the network service provider. For example, the user may wish to access a bank account via the wireless communication device 104 to transfer funds. Prior to permitting user access to the financial institution, the authentication processor 172 presents multiple authentication modes, as will be described in greater detail below.

The authentication data storage 174 may store data used in association with the authentication processor 172 in one or more of the multiple authentication modes. The data stored within the authentication data storage 174 may be stored in any convenient data structure. For example, the data may be stored as a database, look-up table, or other known configuration for data storage.

The data stored in the authentication data storage 174 may be thought of as reference data that will be used for comparison with user-entered data during the authentication process. While not essential to proper operation of the present invention, it is typically desirable to encrypt the reference data to prevent unauthorized access or corruption of the reference data. There are a number of known encryption techniques that may be satisfactorily used to encrypt the reference data. For example, one widely used encryption method uses a one-way hash, such as MD5 or SHA-1 algorithms to transform the original reference user input into a hash value. When the system goes to store the reference data it is first captured from the user and is transformed via a one-way hash, like SHA-1. The stored hash value is placed into the authentication data storage 174. At a later time, when the user is attempting the authentication process using one of the randomly selected authentication modes, the stored hash value can be compared to the transformed user supplied value by running the same hash (e.g., the SHA-1 hash) against the actual values supplied by the user during the authentication process. In one embodiment, the authentication processor 172 (see FIG. 2) may calculate the hash values for the reference data and, at a later time, for the user-entered data. Other hash techniques or other encryption techniques may also be used to protect the reference data in the authentication data storage 174.

The present invention is not limited by the specific implementation of the data structure used for the authentication data storage 174.

Those skilled in the art will recognize that the authentication processor 172 may be implemented as a series of computer instructions stored in the memory 150 and executed by the CPU 148. However, the authentication processor 172 is shown as a separate block in the functional block diagram of FIG. 2 because it performs a separate function. Similarly, the authentication data storage 174 may typically be implemented as a part of the memory 150.

The various components illustrated in FIG. 2 are coupled together by a bus system 176. The bus system may include an address bus, data bus, power bus, control bus, and the like. For the sake of convenience, the various busses in FIG. 2 are illustrated as the bus system 176.

FIG. 2 illustrates the various elements of the electronic device, such as the wireless communication device 104 and/or wireless computer 106. Those skilled in the art will appreciate that the other components illustrated in FIG. 1, such as the PC 116, DVR 126, set-top box 130, ATM 134, and television 138 also contain most of the components illustrated in FIG. 2. While these other electronic devices may not include the transceiver 166, they would typically include the other elements illustrated in the functional block diagram of FIG. 2. Communication between the various other devices and the network 118 is conducted via the NIC 170. In addition, as previously stated, the authentication processor 172 and authentication data storage 174 are present in the electronic device for a stand alone version. In a network implemented version, these elements need not be present within the electronic device.

Figure 3:
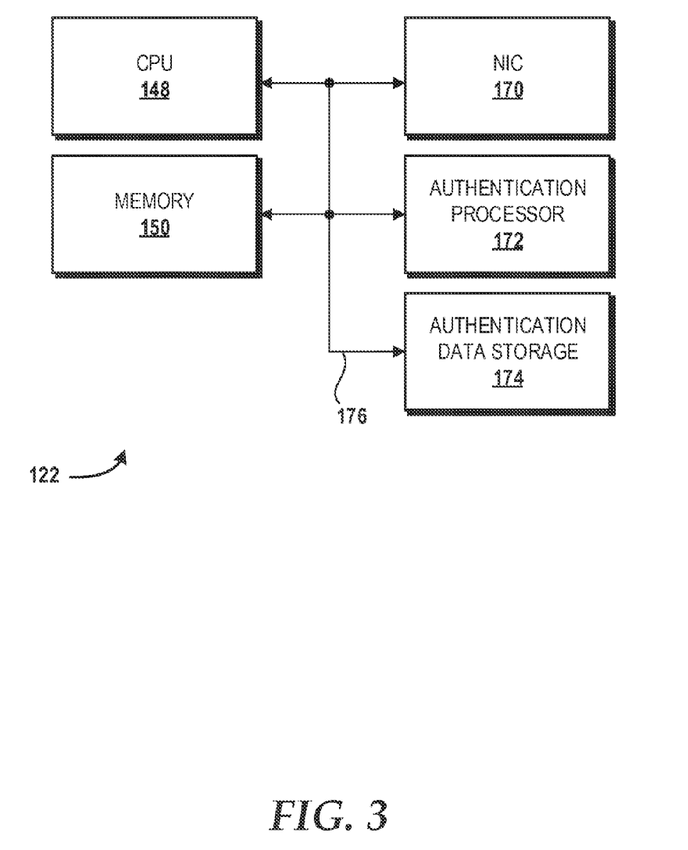
FIG. 3 is a functional block diagram of a security processor, such as illustrated in FIG. 1.

FIG. 3 is a functional block diagram of the security processor 122. As previously noted, the security processor 112 and security processor 122 are functionally equivalent. Therefore, the components described below with respect to the security processor 122 are equally applicable to the security processor 112. Similarly, the security processor 112 or the security processor 122 may be functionally integrated into standalone electronic circuits, such as the DVR 126, the set-top box 130, and the television 138. The security processor 122 includes the CPU 148 and memory 150, which function in a manner such as described above with respect to the electronic device in the functional block diagram of FIG. 2.

Furthermore, the security processor 122 includes the authentication processor 172 and authentication data storage 174. These elements also operate in a manner functionally equivalent to the equivalent components illustrated in the functional block diagram of FIG. 2. The security processor 122 also includes the NIC 170 to communicate with various components via the network 118. The various elements in the functional block diagram of FIG. 3 are coupled together by the bus system 176.

Figure 4:
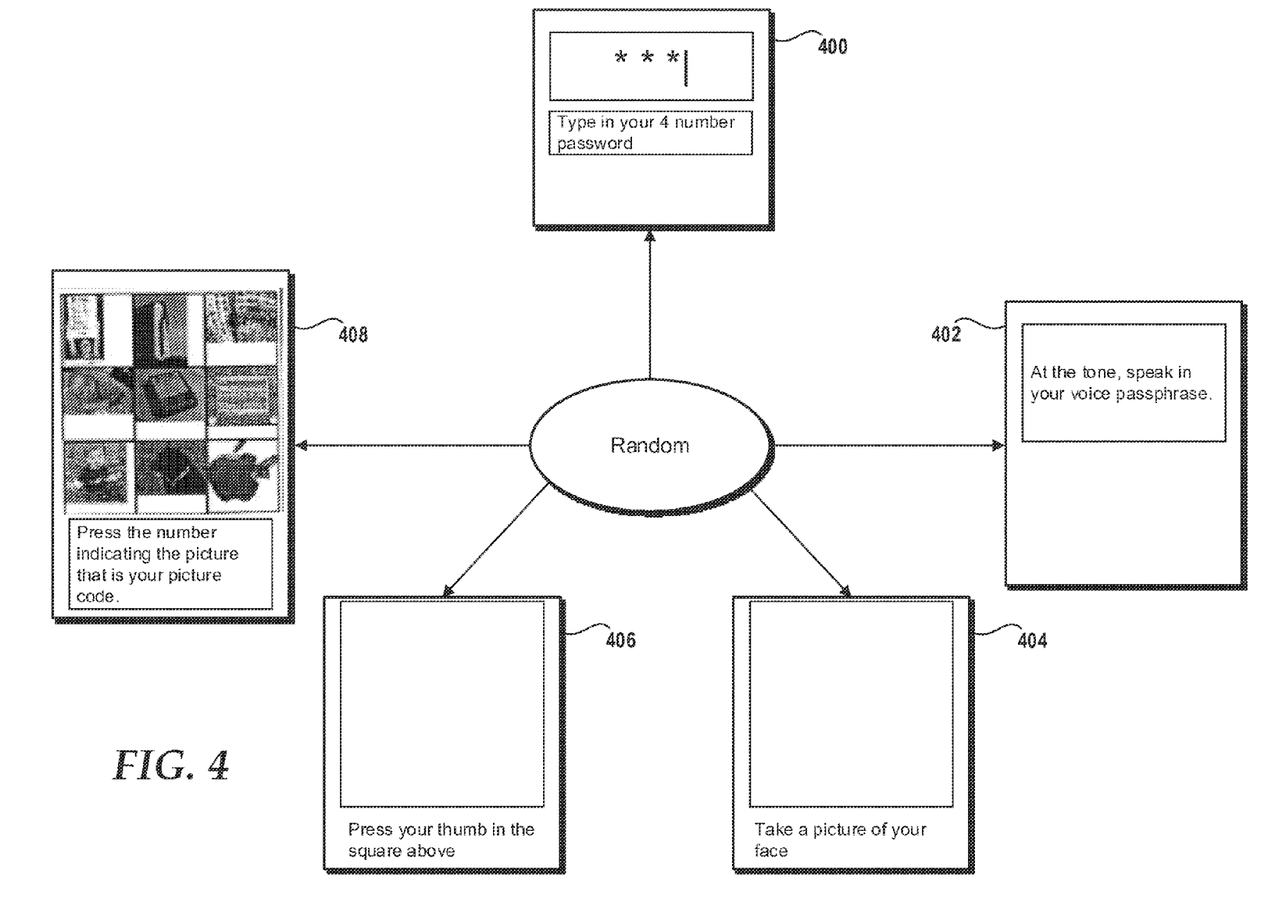
FIG. 4 illustrates the operation of an electronic device to select from among a plurality of authentication modes.

The operation of the password system may now be described in greater detail. The example illustrated in FIG. 4 depicts five of the multiple authentication modes capable of use by the security processor 122. Once the individual user and specific electronic device has been identified, the security processor 122 randomly selects one or more of the authentication modes for presentation to the user. In FIG. 4, a first authentication mode 400 is a PIN mode that requests the user to enter a multi-digit PIN password via the keypad 154 (see FIG. 2). The PIN is previously selected by the user and stored in the password data storage 174 within the security processor 122. The user may operate a keypad on a remote control to enter a PIN in devices such as the DVR 126, set-top box 130, and television 138 that are commonly controlled by remote control devices.

In a second authentication mode 402, the security processor 122 instructs the user to use the audio input device 156 (see FIG. 2) to speak a passphrase at an indicated time. The particular passphrase is previously selected by the user and stored in the authentication data storage 174. The security processor 122 performs conventional voice signature analysis to determine the degree of similarity between the stored voice passphrase stored in the authentication data storage 174 and the spoken voice passphrase entered by the user at the present time.

In a third authentication mode 404, the security processor 122 instructs the user to take a picture of the user's face using the video input device 158. The user provides a facial photograph at a prior time and the initial image is stored in the authentication data storage 174. Upon entry of the new photograph of the user's face, the security processor 122 performs conventional image analysis to determine the degree of similarity between the stored photograph and the newly entered user photograph.

In a fourth authentication mode 406, the security processor 122 instructs the user to place the thumb (or other finger) in a predetermined location and performs a biometric scan using the biometric input device 160. At a prior time, the user enters the biometric image of the thumb (or other finger) and the biometric scan data is stored in the authentication data storage 174. When the user is instructed to place their thumb in the designated area and the biometric input device 160 scans the fingerprint at the present time. The scanned fingerprint is compared by the authentication processor 122, using conventional analysis techniques, with the stored biometric scan data stored in the authentication data storage 174.

In a fifth authentication mode 408, the user is presented with multiple thumbnail images and instructed to select a number on the keypad 154 (see FIG. 2) that corresponds to a user-selected image. The user selects an image at an earlier time and the image is stored in the authentication data storage 174. For example, the user can activate the video input device 158 to generate an image of the user's choosing. Alternatively, the user can select an image from a large number of possible images presented to the user at a prior time. The authentication data storage 174 may also include a number of images not selected by the user that are presented in the authentication mode 408 as false images or "distracters." The user activates the keypad 154 to select the user-selected image. With some devices, such as the television 138, the user may operate a keypad on a remote control to select the user-selected image.

Other authentication modes, such as a query-directed mode (e.g., "what is your mother's maiden name?") can also be used by the authentication system. The authentication modes presented above are merely representative of the plurality of authentication modes useable by the system. The present invention is not limited by the specific form of any particular authentication mode or limited to any particular set of authentication modes.

One can appreciate that some of the password modes described in FIG. 4 produce definitive results (i.e., a YES or NO result). For example, user entry of a PIN number either produces an exact match access is denied. Other modes, such as speech analysis, image analysis, or biometric scan of a thumbprint, require analysis that determines a degree of similarity between the newly entered data and the data stored in the authentication data storage 174. The precise threshold at which a match is declared can be varied and is within the scope of knowledge of one skilled in the art. In addition, other authentication modes may be used in addition to or in place of those modes illustrated in FIG. 4. For example, high security authentication modes may use an iris scanning technology. The authentication system described herein is not limited to any specific authentication mode.

Figure 5:
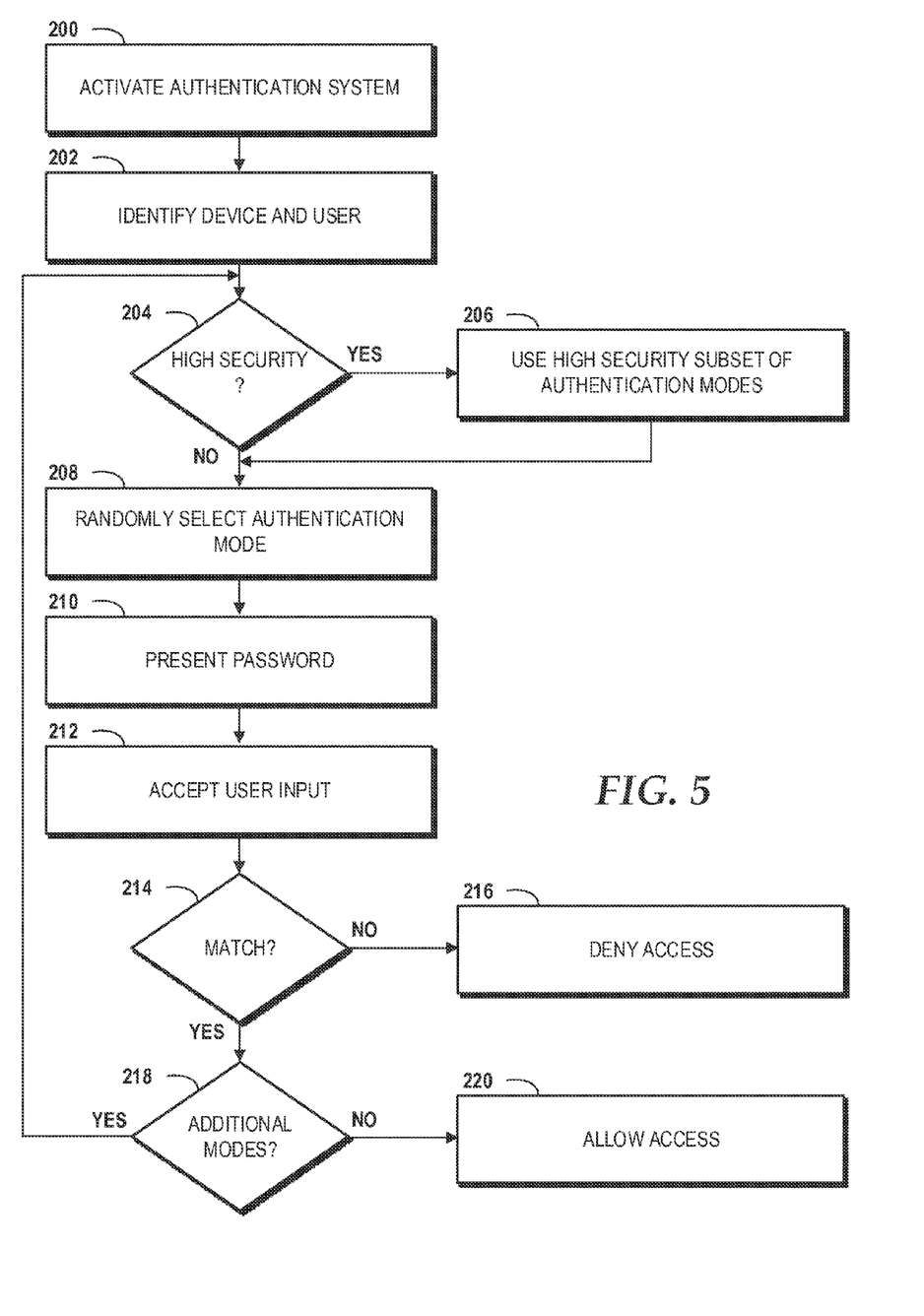
FIG. 5 is a flow chart illustrating the operation of the multi-modal authentication system constructed in accordance with the present teachings.

The operation of the password system is illustrated in the flowchart of FIG. 5 where, at step 200, the authentication system is activated. Activation of the authentication system can be triggered by numerous events. For example, the activation of standalone devices such as the television 138 occurs when the television is turned on. Other devices, such as the wireless communication device 104 may already be turned on, and the authentication system activated in step 200 when the user attempts to perform an action, such as placing a telephone call or activating a web browsing function. Alternatively, the authentication system can be activated in step 200 when the user logs onto a system, such as a computer system start-up or logging on to a service provider system. In yet another example, the ATM 134 (see FIG. 1) can activate the authentication system when a user inserts a credit card, debit card, or the like.

In step 202, the authentication system identifies the particular device and user. Again, standalone systems are inherently identified (i.e., a television knows that it is a television). The user may still be required to select from among several authorized user of the device because the authentication system can utilize separate passwords and multiple authentication modes for each authorized user of the television 138. The user is identified by the ATM 134 when the debit card is inserted into the machine. Other devices, such as the wireless computer 106 or the PC 116 may require a log-on operation. In a log-on operation, which is well known in the art, the user may enter a user name and, instead of a conventional password, the authentication system is activated in step 200 and presents the user with randomly selected authentication modes as will be described in greater detail below.

In optional step 204, the authentication system determines whether the requested action involves a high security communication or operation. Although not essential to satisfactory operation of the authentication system, it is possible to have a plurality of authentication modes, some of which are more robust and provide a greater degree of security. In a high security operation, the authentication system may select authentication modes from among a subset of high security authentication modes.

In yet another alternative embodiment, the authentication system may have a subset of low security authentication modes for use in low security operations. For example, setting parental limits on the television 138 may not require the degree of security that is desired in a financial transaction over the network 118. Accordingly, in the low security embodiment, the authentication system may select authentication modes from among a subset of low security authentication modes.

Returning FIG. 5, if the communication is a high security communication, the result of decision 204 is YES, and in step 206, the authentication system will use the subset of high security authentication modes. Those skilled in the art will appreciate that this is an optional operation. The password security system can operate satisfactorily by simply selecting randomly from among the all of the authentication modes.

In step 208, the authentication security system randomly selects one of the plurality of authentication modes and, in step 210, presents the authentication challenge to the user.

In step 212, the authentication security system accepts the user input and, in decision 214, the authentication security system determines whether there is a match. As previously discussed, the authentication data storage 174 (see FIGS. 2-3) store answer data, such as PIN codes, sample voice or image data, or the like. As previously discussed, some authentication modes, such as a PIN mode, have a precise result while other systems, such as voice pattern matching, measure a degree of similarity. If it is determined that there is no match between the user data accepted in step 212 and the data stored in the authentication data storage 174 (see FIGS. 2-3), the result of decision 214 is NO and, in step 216, the authentication system denies access to the electronic device.

If the user input matches the data stored in the authentication data storage 174, the result of decision 214 is YES. In that event, the authentication system determines, in decision 218, whether additional authentication steps are required. As previously discussed, the authentication system can require a plurality of randomly selected authentication modes.

In one embodiment, the number of authentication modes required for final access to the electronic device may depend on the nature of the communication with low security operations requiring the successful completion of fewer authentication modes while higher security operations will require the successful completion of a larger number of authentication modes.

For example, in low security operation such a parental settings on the television 138 (see FIG. 1), the authentication system may use only one randomly selected authentication mode. Alternatively, in a high security operation, the authentication system may select a plurality of authentication modes, each of which must successfully be completed by the user.

If additional authentication modes are required, the result of decision 218 is YES and, the authentication system returns to decision 204 to process additional authentication modes. If no additional authentication modes are required, the result of decision 218 is NO and, in step 220, the authentication security system allows access to the electronic device.

If the authentication system requires a plurality of authentication modes, it is possible that the same authentication mode would randomly be selected a second time. However, the authentication security system may also be configured such that a particular authentication mode is used only once in a particular operation. Thus, the second randomly selected authentication mode will not include the authentication mode used the first time. Similarly, if the authentication security system requires three authentication modes, it will randomly select three authentication modes, none of which will be used more than once.

Thus, the authentication system utilizes a plurality of authentication modes that are randomly selected for presentation to the user. The random nature of the authentication mode selection prevents snooping by unscrupulous individuals that may seek to intercept passwords, such as a PIN. In addition, the individual authentication modes are easy for the user to understand and remember, which reduces overall complexity. That is, the authentication system provides a high degree of security without the user having to remember complex data, such as a 12 digit alphanumeric passcode.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Accordingly, the invention is not limited except as by the appended claims.

The invention claimed is:

1. An authentication system comprising:
an authentication data storage storing reference data for authentication, the reference data comprising a correct user-selected image, a user-selected personal identification number, a user-selected voice passphrase, a user-selected photograph, and a user-selected biometric; and
an authentication processor in communication with the authentication data storage, the authentication processor performing operations comprising
receiving a user identification,
identifying a user based upon the user identification,
randomly selecting at least two authentication modes from a group of available authentication modes for presentation to the user in solicitation of input for use in authenticating the user to utilize an electronic device, wherein the group of available authentication modes is associated with the user identification and consists of:
a first authentication mode in which multiple thumbnail images, including the correct user-selected image and a plurality of false images, and an instruction to select a number on a keypad of the electronic device corresponding to the correct user-selected image are presented,
a second authentication mode in which the user is prompted to enter a personal identification number for comparison to the user-selected personal identification number,
a third authentication mode in which the user is prompted to speak a voice passphrase for comparison to the user-selected voice passphrase,
a fourth authentication mode in which the user is prompted to take a photograph of the user for comparison to the user-selected photograph, and
a fifth authentication mode in which the user is prompted to provide a biometric input for comparison to the user-selected biometric, receiving a response to each of the at least two authentication modes,
determining whether a match exists between the response received for each of the at least two authentication modes and a portion of the reference data corresponding to each of the at least two authentication modes by comparing the response received for each of the at least two authentication modes with the portion of the reference data corresponding to each of the at least two authentication modes, and
allowing the user to utilize the electronic device if the authentication processor determines that a match exists between the response received for each of the at least two authentication modes and the portion of the reference data corresponding to each of the at least two authentication modes.

2. The authentication system of claim 1, wherein the electronic device is used in a high security activity, and wherein the at least two authentication modes are randomly selected from a high security subset of the group of available authentication modes.

3. The authentication system of claim 1, wherein the authentication processor is located in a different location than the electronic device.

4. The authentication system of claim 3, wherein the electronic device is a wireless communication device and communicates with the authentication processor via a wireless communication link.

5. The authentication system of claim 1, wherein the authentication processor is coupled to the electronic device via a Wide Area Network.

6. The authentication system of claim 5, further comprising a communication interface including a network interface controller for communicating with the authentication processor via the Wide Area Network.

7. The authentication system of claim 1, wherein the authentication processor is coupled to the electronic device via a Local Area Network.

8. The authentication system of claim 7, further comprising a communication interface including a network interface controller for communicating with the authentication processor via the Local Area Network.

9. The authentication system of claim 1, wherein the authentication processor is embedded within the electronic device.

10. The authentication system of claim 1, wherein the authentication data storage stores the reference data in an encrypted form.

11. The authentication system of claim 1, further comprising a library of authentication modes, the library of authentication modes storing the group of available authentication modes.

12. The authentication system of claim 1, wherein the authentication processor performs additional operations comprising analyzing the voice passphrase during the third authentication mode to determine a degree of similarity between the user-selected voice passphrase stored in the authentication data storage and the voice passphrase recorded at an indicated time.

13. The authentication system of claim 1, wherein the authentication processor performs additional operations comprising analyzing the photograph during the fourth authentication mode to determine a degree of similarity between the user-selected photograph and the photograph.

14. The authentication system of claim 1, wherein the system is integrated into the electronic device.

15. The authentication system of claim 14, wherein the electronic device is a television set.

16. The authentication system of claim 1, wherein the electronic device is an automatic teller machine.

17. A non-transitory computer-readable medium having instructions stored thereon that, when executed by a processor, cause the processor to perform operations comprising:
   causing reference data for authentication of a user to be stored in an authentication data storage, the reference data comprising a correct user-selected image, a user-selected personal identification number, a user-selected voice passphrase, a user-selected photograph, and a user-selected biometric;
   receiving a user identification;
   identifying a user based upon the user identification;
   randomly selecting at least two authentication modes from a group of available authentication modes for presentation to the user in solicitation of input for use in authenticating the user to utilize an electronic device, wherein the group of available authentication modes is associated with the user identification and consists of:
      a first authentication mode in which multiple thumbnail images, including the correct user-selected image and a plurality of false images, and an instruction to select a number on a keypad of the electronic device corresponding to the correct user-selected image are presented,
      a second authentication mode in which the user is prompted to enter a personal identification number for comparison to the user-selected personal identification number,
      a third authentication mode in which the user is prompted to speak a voice passphrase for comparison to the user-selected voice passphrase,
      a fourth authentication mode in which the user is prompted to take a photograph of the user for comparison to the user-selected photograph, and
      a fifth authentication mode in which the user is prompted to provide a biometric input for comparison to the user-selected biometric;
   receiving a response to each of the at least two authentication modes;
   determining whether a match exists between the response received for each of the at least two authentication modes and a portion of the reference data corresponding to each of the at least two authentication modes by comparing the response received for each of the at least two authentication modes with the portion of the reference data corresponding to each of the at least two authentication modes; and
   allowing the user to utilize the electronic device if the processor determines that a match exists between the response received for each of the at least two authentication modes and the portion of the reference data corresponding to each of the at least two authentication modes.

18. The non-transitory computer-readable medium of claim 17, wherein the authentication data storage stores the reference data in an encrypted form.

19. The non-transitory computer-readable medium of claim 17, wherein the processor is located in a different location than the electronic device.

20. The non-transitory computer-readable medium of claim 19, wherein the electronic device is a wireless communication device and communicates with the processor via a wireless communication link.

21. The non-transitory computer-readable medium of claim 17, wherein the processor is embedded within the electronic device.

22. A method comprising:
   causing, by an authentication processor, reference data for authentication to be stored in an authentication data storage, the reference data comprising a correct user-selected image, a user-selected personal identification number, a user-selected voice passphrase, a user-selected photograph, and a user-selected biometric;
   randomly selecting, by the authentication processor, at least two authentication modes from a group of available authentication modes for presentation to a user in solicitation of input for use in authenticating the user to utilize an electronic device, wherein the group of available authentication modes is associated with the user identification and consists of:
      a first authentication mode in which multiple thumbnail images, including the correct user-selected image and a plurality of false images, and an instruction to select a number on a keypad of the electronic device corresponding to the correct user-selected image are presented, a second authentication mode in which the user is prompted to enter a personal identification number for comparison to the user-selected personal identification number,
  a third authentication mode in which the user is prompted to speak a voice passphrase for comparison to the user-selected voice passphrase,
  a fourth authentication mode in which the user is prompted to take a photograph of the user for comparison to the user-selected photograph, and
  a fifth authentication mode in which the user is prompted to provide a biometric input for comparison to the user-selected biometric receiving, at the authentication processor, a response to each of the at least two authentication modes;

determining, using the authentication processor, whether a match exists between the response received for each of the at least two authentication modes and a portion of the reference data corresponding to each of the at least two authentication modes by comparing the response received for each of the at least two authentication modes with the portion of the reference data corresponding to each of the at least two authentication modes; and allowing the user to utilize the electronic device if the authentication processor determines that a match exists between the response received for each of the at least two authentication modes and the portion of the reference data corresponding to each of the at least two authentication modes.

23. The method of claim 22, wherein randomly selecting the at least two authentication modes further comprises randomly selecting the at least two authentication modes without replacement after each selection.

24. The method of claim 22, wherein the group of available authentication modes are stored in a library of authentication modes.

* * * * *